US008894905B2

(12) United States Patent
Breault

(10) Patent No.: US 8,894,905 B2
(45) Date of Patent: *Nov. 25, 2014

(54) HEAT TREAT CONFIGURATION FOR POROUS CARBON-CARBON COMPOSITES

(71) Applicant: Ballard Power Systems Inc., Burnaby (CA)

(72) Inventor: Richard D. Breault, North Kingstown, RI (US)

(73) Assignee: Ballard Power Systems Inc., Burnaby (CA)

( * ) Notice: Subject to any disclaimer, the term of this patent is extended or adjusted under 35 U.S.C. 154(b) by 4 days.

This patent is subject to a terminal disclaimer.

(21) Appl. No.: 13/680,721

(22) Filed: Nov. 19, 2012

(65) Prior Publication Data
US 2013/0078077 A1    Mar. 28, 2013

Related U.S. Application Data

(62) Division of application No. 12/739,205, filed as application No. PCT/US2007/087749 on Dec. 17, 2007, now Pat. No. 8,357,253.

(51) Int. Cl.
| B29C 65/02 | (2006.01) |
| B65G 57/00 | (2006.01) |
| C04B 35/64 | (2006.01) |
| C04B 35/83 | (2006.01) |
| H01M 8/02 | (2006.01) |
| H01M 8/08 | (2006.01) |
| H01M 8/10 | (2006.01) |

(52) U.S. Cl.
CPC ............... *B65G 57/00* (2013.01); *C04B 35/64* (2013.01); *C04B 35/83* (2013.01); *H01M 8/0234* (2013.01); *H01M 8/0245* (2013.01); *C04B 2235/9623* (2013.01); *H01M 8/086* (2013.01); *H01M 2008/1095* (2013.01); *Y02E 60/50* (2013.01)
USPC .............................................. 264/320; 156/64

(58) Field of Classification Search
USPC ......................................................... 264/320
See application file for complete search history.

(56) References Cited

U.S. PATENT DOCUMENTS

| 5,863,673 A | 1/1999 | Campbell et al. |
| 5,942,348 A | 8/1999 | Jansing et al. |

(Continued)

OTHER PUBLICATIONS

International Search Report for PCT Application No. PCT/US2007/087749, Jul. 29, 2008.

*Primary Examiner* — Yogendra Gupta
*Assistant Examiner* — Robert J Grun
(74) *Attorney, Agent, or Firm* — Seed IP Law Group PLLC

(57) ABSTRACT

A method of heat treating a substrate for a fuel cell includes stacking substrates to form a group. A dimension is determined for a plate corresponding to a resulting mass that is less than a predetermined mass. The plate is arranged above the group to apply a weight of the plate to the group. The resulting masses for spacer plates and intermediate lifting plates, for example, are minimized to reduce the pressure differential between the bottom and top substrates in the heat treat assembly. In another disclosed method, a dimension for a plate, such as a top plate, is determined that corresponds to a resulting mass that is greater than a predetermined mass. The plate is arranged above the group to apply a weight of the plate to the group. The top plate resulting mass is selected to minimize a variation in the average pressure of the substrates throughout the heat treat assembly.

12 Claims, 5 Drawing Sheets

(56) References Cited

U.S. PATENT DOCUMENTS

| | | |
|---|---|---|
| 6,129,868 A | 10/2000 | Penkov et al. |
| 6,368,737 B1 | 4/2002 | Margiott et al. |
| 6,503,856 B1 | 1/2003 | Broadway et al. |
| 6,878,331 B2 | 4/2005 | Huang et al. |
| 8,357,253 B2 * | 1/2013 | Breault .......................... 156/64 |
| 2008/0131775 A1 | 6/2008 | Takayama et al. |
| 2010/0230031 A1 * | 9/2010 | Breault .......................... 156/64 |

* cited by examiner

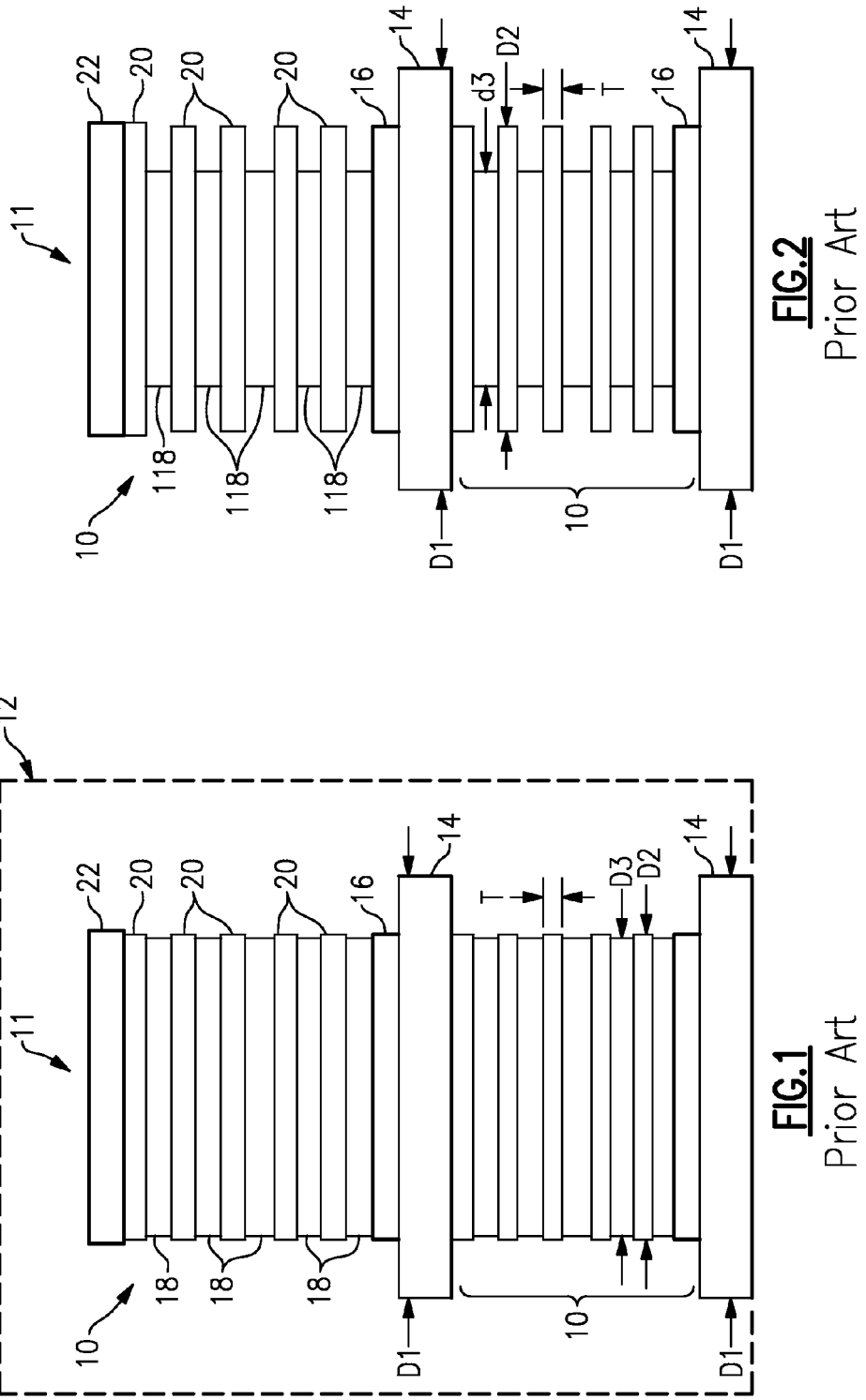

HEAT TREAT CONFIGURATION FOR POROUS CARBON-CARBON COMPOSITES

BACKGROUND

This disclosure relates to a porous carbon-carbon composite suitable for use as a substrate in fuel cells, for example.

Some types of fuel cells, such as proton exchange membrane and phosphoric acid fuel cells (PEMFC and PAFC), use porous carbon-carbon composites as electrode substrates, which are also referred to as gas diffusion layers. One example fuel cell substrate and manufacturing process is shown in U.S. Pat. No. 4,851,304.

One typical method of making a substrate includes: (1) forming a non-woven felt from a chopped carbon fiber and a temporary binder by a wet-lay paper making process, (2) impregnating or pre-pregging the felt with a phenolic resin dissolved in a solvent followed by solvent removal without curing the resin, (3) pressing one or more layers of felt to a controlled thickness at a temperature sufficient to cure the resin, (4) heat treating the felt in an inert atmosphere to between 750-1000° C. to convert the phenolic resin to carbon, and (5) heat treating the felt in an inert atmosphere to between 2000-3000° C. to improve thermal and electrical conductivities and to improve corrosion resistance. The art as illustrated by 4,851,304 is incomplete because it does not teach how to produce substrates with a uniform porosity, bulk density, and thickness in a high volume heat treating operation.

The porous carbon-carbon composites used in fuel cells typically have a porosity of 70-75%, which corresponds to a bulk density of 0.48-0.58 g/mL for an example substrate. It is desirable to control the porosity within a tight range because it affects the properties of the substrate that, in turn, influence the performance of the fuel cell. The thickness of these substrates ranges from 0.12-2.00 mm, but thicknesses in the range of 0.12-0.50 mm are more typical. These substrates typically have a planform size of 50-100 cm×50-100 cm. The 2000-3000° C. heat treating step, frequently referred to as graphitization, is done in known induction or Acheson type furnaces in an inert atmosphere. A typical furnace load may contain a stack of approximately 2000 substrates and is about 72-120 inches (183-305 cm) tall.

The thickness of each substrate decreases by about 33% during heat treat due to pyrolysis of the thermoset resin. There is a tendency for the substrates to warp as a result of this shrinkage. Spacer plates are placed between groups of 50-200 substrates in the heat treat stack to maintain the flatness of the substrates as they shrink during heat treat.

Example prior art heat treat assemblies 11 are shown in FIGS. 1 and 2. The arrangement illustrated in FIG. 1 depicts a heat treat assembly of a first generation substrate having a planform dimension D3. As the fuel cell was redesigned, a smaller substrate having a planform D3 was developed. However, the reusable tooling employed in the heat treat assembly 11 has not been changed as the substrates became smaller since there was no apparent need and due to the large expense of manufacturing new tooling for the heat treat assemblies.

It has been found that the bulk density of the heat treated substrate varies with its position within the heat-treat stack and more specifically with the local pressure within the heat treat stack. One skilled in the art can calculate the local pressure at any point in the stack by summing the weight of the substrates and tooling above the point and dividing it by the area of the substrates. FIG. 4 shows substrate density versus position within the furnace for the configurations shown in FIG. 2. The relevant tooling in this instance consisted of ½"×33"×33" graphite spacer plates placed between each group of 50 substrates. There was also a 48" diameter lifting fixture and a 33"×33'×4" base plate in the center of the furnace load. The pressure variation from the top to the bottom of this particular stack was analyzed and is shown in FIG. 5 as a graph of pressure versus position in the furnace. The sharp discontinuity in the center is due to the lifting fixture and base plate. The over-all pressure range is small; but has a significant influence on the porosity and bulk density of this porous carbon-carbon composite. The average pressure is 2.8 psi with a range of +/−2.3 psi or +/−82% from the top to the bottom. Substrates on the bottom of the heat treat assembly are most dense and those on top are the least dense. This is particularly true of arrangements such as those shown in FIG. 2. This results in a low process yield with a significant number of parts being unacceptable because they do not meet the density specification. There is a need for a heat treat tooling configuration that minimizes the pressure variation between the top and bottom of the heat-treat stack.

SUMMARY

A method of heat treating a porous carbon-carbon composite, such as a substrate for a fuel cell, is disclosed. The methodology defines the criteria for selecting the tooling configuration for heat-treating a stack of porous carbon-carbon composites where the tooling is configured such that the pressure variation between the top most part and the bottom most part in the heat-treat stack is less than +/−30%, and preferably less than +/−15%.

The method includes stacking substrates to form a group. A plate is arranged above the group to apply a weight of the plate to the group. Multiple groups of substrates and spacers are then placed into a stack. The substrates per spacer, thickness of the spacer and planform of the spacer relative to the planform of the substrate, the height of the stack and the resulting masses for spacer plates and intermediate lifting plates, for example, are selected to minimize the pressure differential between the bottom and top substrates in the heat treat assembly.

In another disclosed method, a weight for a plate, such as a top plate, is determined. The plate is arranged above the group, in one example above the topmost substrate in the heat treat assembly, to apply a weight of the plate to the group. The weight of the top plate is selected, in combination with the previously mentioned factors to control the average pressure of the substrates, and hence the average density of the substrate within the heat treat assembly.

These and other features of the present invention can be best understood from the following specification and drawings, the following of which is a brief description.

BRIEF DESCRIPTION OF THE DRAWINGS

FIG. 1 is a schematic view of one example prior art heat treat assembly using a first generation substrate.

FIG. 2 is an example prior art heat treat assembly using a second generation substrate that is smaller than the first generation substrate with the same heat treat assembly tooling as illustrated in FIG. 1.

DETAILED DESCRIPTION OF THE PREFERRED EMBODIMENT

Figure 3:
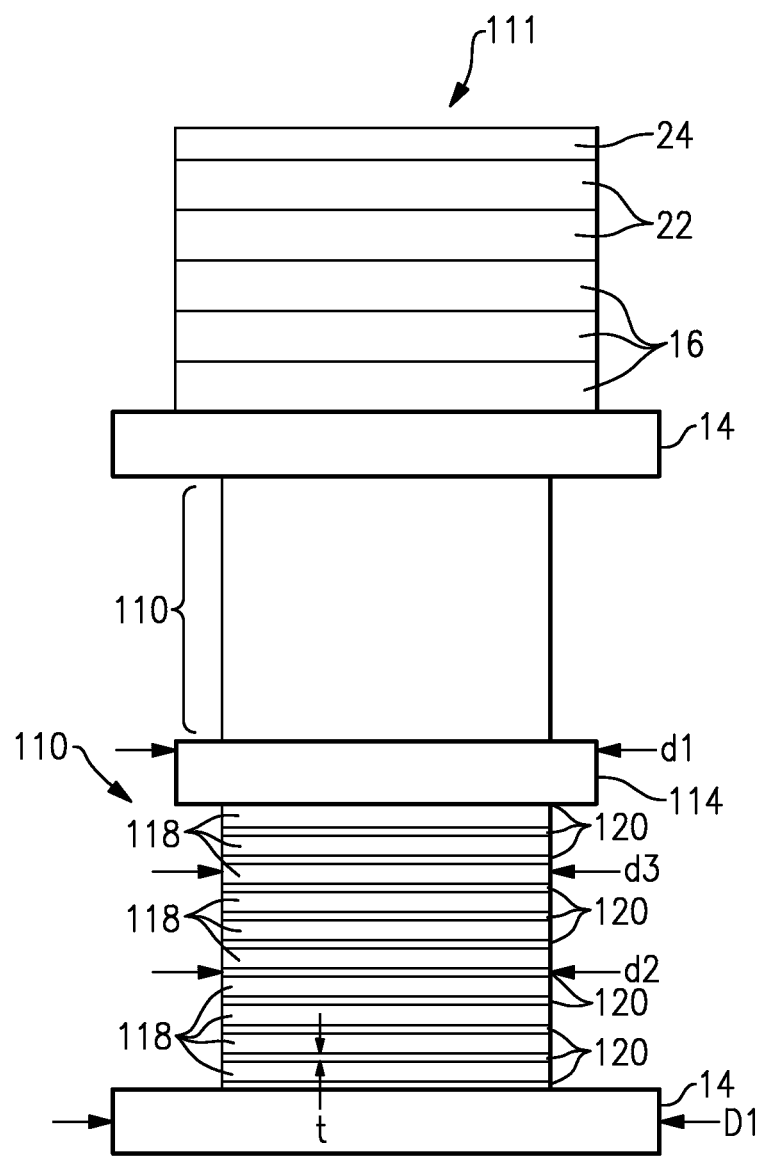
FIG. 3 is a schematic view of one example heat treat assembly with reduced variation in the average pressure and decreased pressure differential between the top and bottom substrates in the heat treat assembly.

Prior art heat treat assemblies 11 are shown in FIGS. 1 and 2. The heat treat assemblies 11 include carbon substrates and tooling. The tooling is used to move the substrates into and out of a furnace 12 and to apply weight to the substrates to prevent warping during heat treat. The tooling is typically made of graphite but could be some other high temperature material. FIG. 1 illustrates groups 18 an earlier substrate design that measure 32 inches (D3)×32 inches×0.016 inches (81 cm×81 cm×0.04 cm). The groups 118 include substrates of a later design that measure 23 inches×23 inches×0.016 inches (58 cm×58 cm×0.04 cm).

Graphite spacer plates 20 of 33 inches (D2)×33 inches×½ inch (84 cm×84 cm×1 cm) are placed between each group of fifty substrates, for example. The spacer plates 20 prevent the substrates from warping during heat treat. A 48 inches (122 cm) diameter, D1, lifting plate 14 and a 33 inches×33 inches×4 inches (84 cm×84 cm×10 cm) base plate 16 are arranged in the center of the furnace load. The term "diameter" represents the width of the object, and does not require the object to be circular.

Figure 4:
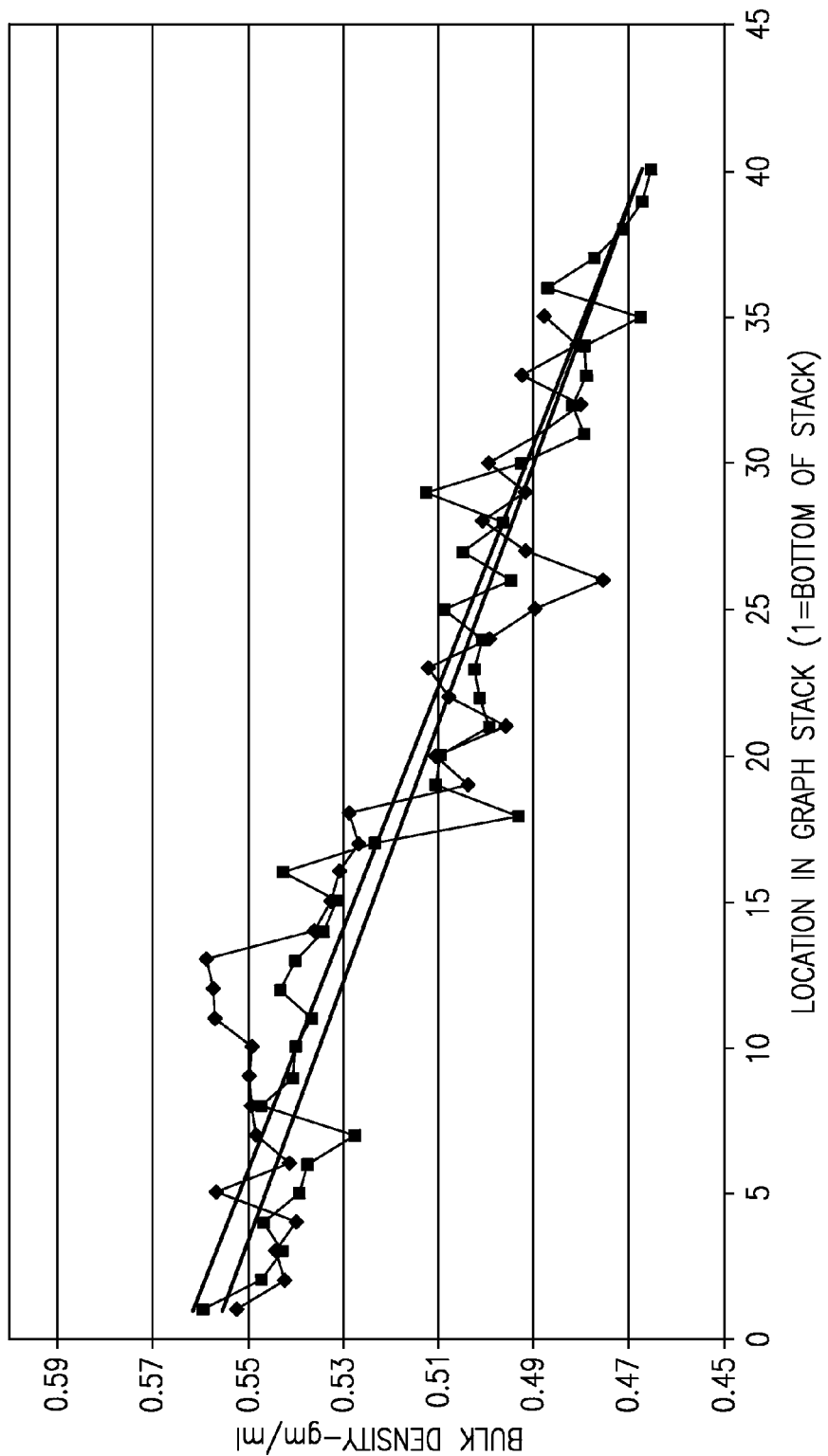
FIG. 4 is a plot of substrate density versus position within the heat treat stack.
Figure 5:
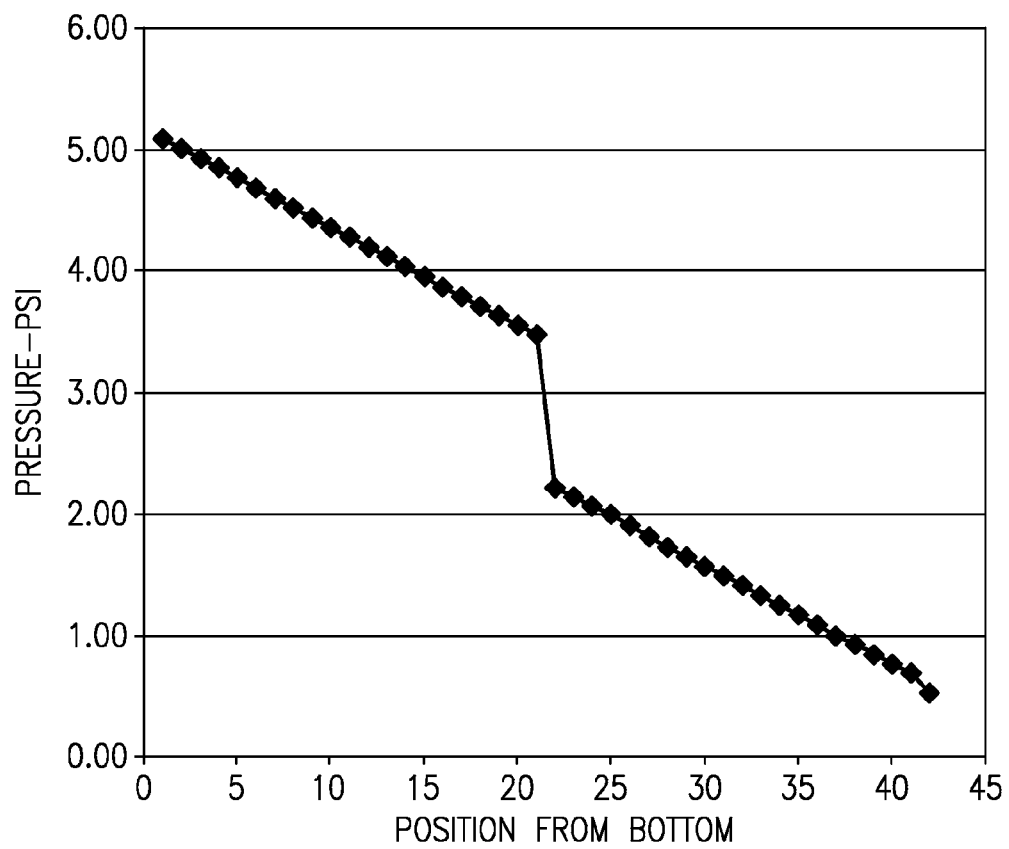
FIG. 5 is a plot of substrate density versus pressure within the heat treat stack.

The variation in density of the substrates versus position in the heat treat stack is shown in FIG. 4 for two different furnace runs. The variation in pressure versus position for the configuration in FIG. 2 is shown in FIG. 5. There is a sharp pressure discontinuity in the center of the heat treat assembly 11 due to the lifting plate 14 and base plate 16 masses. Larger spacer plate masses increase the pressure differential between the bottom-most and topmost substrates in the heat treat assembly 11. The overall pressure range is small, but has a significant influence on the porosity and bulk density of the example porous carbon-carbon composite. The average pressure is 2.8 psi (0.190 bar) with a range of +/−2.3 psi (0.155 bar) or +/−82% from the top to the bottom, in the example shown in FIG. 2. The density of the substrates heat treated in this configuration varied from 0.47 to 0.56 gm/mL which is a greater range than is required.

A single top plate 22 is arranged at the top of the stack of tooling and substrates to apply additional weight to the heat treat assembly 11. The top plate 22 was typically a graphite plate 4 inches (10 cm) thick having a diameter similar to that of the base plates 16 and spacer plates 20.

An example heat treat assembly 111 according to this disclosure is shown in FIG. 3. The tooling plates are designed to provide a resulting mass that applies a desired weight to the substrates in a desired location in the heat treat assembly. The heat treat assembly 111 includes multiple substrate assemblies 110, only two of which are shown. A lifting plate 14 is arranged at the bottom of the heat treat assembly 111. The lifting plate 14 includes features that enable the heat treat assembly 111 to be inserted and removed in the furnace. In one example, the lifting plate 14 has a diameter D1 of approximately 48 inches (122 cm).

Multiple substrates are stacked to form groups 118. In one example, fifty substrates are arranged adjacent to one another and are each approximately 0.4 mm thick. The example substrates have a substrate diameter d3 of approximately 23 inches (58 cm). Spacer plates 120 are arranged between the substrate groups 118 to apply a weight and prevent warping of the substrates during heat treating. It is desirable to minimize the mass of the spacer plates 120 to reduce the pressure variation or differential of the substrates from the bottom of the heat treat assembly 111 to the top of the heat treat assembly 111. In one example, the spacer plates 120 are ¼ inch thick (0.6 cm), which is thick enough so that the spacer itself does not warp, and include a spacer plate diameter d2 of approximately 23 inches (58 cm).

Typically, lifting plates are arranged between substrate assemblies 110 so that fewer than all of the substrate groups 118 can be removed from the furnace. The mass of the lifting plates can undesirably increase the pressure variation between the substrate assemblies 110. To this end, it is desirable to minimize the mass of the intermediate lifting plates 114. Accordingly, the diameter d1 of intermediate lifting plates 114 are reduced. In one example, the intermediate lifting plate 114 is approximately 35 inches (89 cm) in diameter.

In another embodiment it is desirable to provide an increase mass above all of the substrate assemblies 110, which increases the average pressure in the heat treat stack. One example method of achieving a larger mass at the top of the heat treat assembly 111 using available heat treat assembly tooling from prior art heat treat assembly arrangements is shown in FIG. 3. A large lifting plate 14 is arranged above the top substrate assembly 110. Multiple base plates 16 are stacked onto the lifting plate 14. Multiple top plates 22 are arranged above the lifting plate 14. Additionally, another plate 24 can be added to the top of the heat treat assembly 111 to increase the mass.

Approaches to obtaining a more uniform pressure distribution within the heat-treat stack includes, for example, minimizing the weight of the tooling between the top most and bottom most substrate. This can be achieved by: maximizing the substrates per spacer, decreasing the thickness of the spacers, decreasing the planform of the spacers so they are approximately the same size as the substrates, eliminating intermediate stacking plates, minimizing the thickness and planform size of any lifting fixtures and decreasing the height of the stack.

An example number of substrates per spacer is between 25 and 200, with 50 to 100 being desirable, for example, to maintain flatness of the heat-treated substrates. The spacer thickness can be between 0.125 inch (0.32 cm) and 0.375 inch (0.0.95 cm), with 0.250 inch (0.64 cm) being desirable, for example, as being rigid enough not to deflect during heat-treating. The spacers are approximately the same size as the substrates, and no more than 2 inches (5 cm) larger than the substrates, for example. The intermediate lifting fixture is preferably eliminated if possible (intermediate lifting fixture 114 present in FIG. 3).

In one example, it is desirable to have a pressure distribution between the topmost and bottom most substrate that is +/−25% to produce substrates with an acceptable range of bulk densities. This can be achieved with the configuration shown in FIG. 3 that contains 50 substrates per spacer. The spacers were 24 inches (60 cm) by 24 inches (60 cm) by 0.25 inch (0.64 cm) thick.

Figure 6:
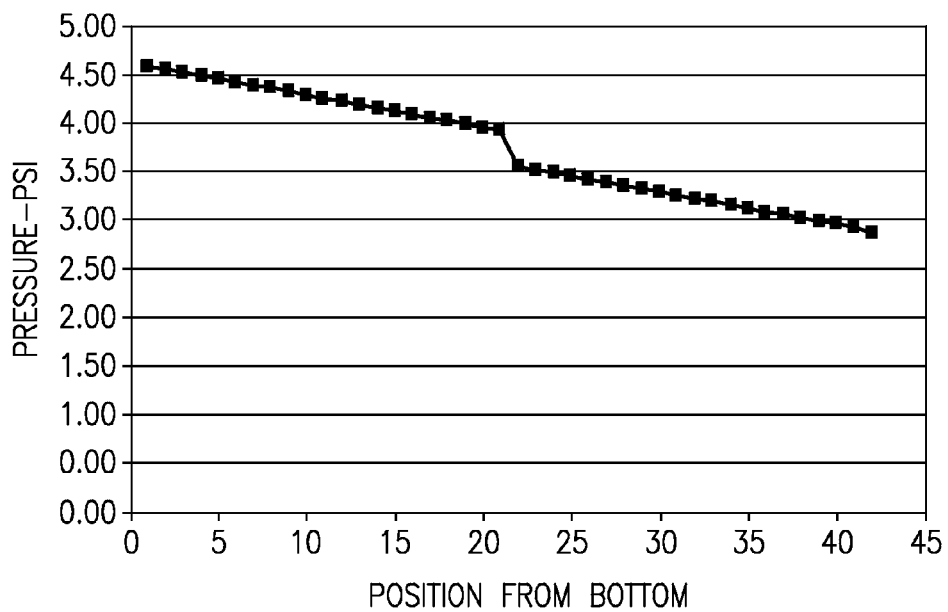
FIG. 6 is a plot of pressure versus position within the heat treat stack for a configuration according to this disclosure having a lower pressure differential between the top and bottom substrates in the heat treat assembly.

The pressure variation from the top to the bottom of one example stack was analyzed and is shown in FIG. 6. The average pressure is 3.73 psi (0.267 bar) with a range of +/−0.87 psi (0.066 bar) or +/−23% from the top to the bottom of the stack compared to an 82% variation in pressure for the prior art configuration. The predicted density range for the new tooling is 0.51-0.55 g/mL versus 0.47-0.57 g/mL for the prior art tooling which is a more desirable variation. Increasing the number of substrates per spacer from 50 to 100 and eliminating the lifting fixture in the center of the stack for the configuration in FIG. 3 results in a further reduction in the pressure variation from the top substrate to the bottom substrate. The average pressure is 3.4 psi (0.23 bar) with a range of +/−0.5 psi (0.034 bar) or +/−14.7% from the top to the bottom of the stack compared to an 82% variation in pressure for the prior art configuration.

The average density of the heat-treated substrates is determined by a combination of factors including the density at lamination, the shrinkage that occurs in heat treat which is related to the resin content and to the weight on top of the heat treating stack. One experienced in the art can systematically vary these parameters to produce the desired substrate density. The tooling is configured such that the pressure variation between the top most part and the bottom part in the heat-treat stack is less than +/−30% and most preferably less than +/−15%.

Although an example embodiment has been disclosed, a worker of ordinary skill in this art would recognize that certain modifications would come within the scope of the claims. For that reason, the following claims should be studied to determine their true scope and content.

What is claimed is:

1. A method of heat treating a stack of porous carbon-carbon composites comprising the following steps in order:
   determining a thickness and planform of a plate;
   determining the number of porous carbon-carbon composites per plate;
   stacking the determined number of porous carbon-carbon composites to form a group between plates;
   determining the number of groups per stack;
   selecting the size and number of any intermediate lifting plates;
   arranging each component within the stack such that the pressure differential between the top-most composite and bottom most composite in the stack is within +/−30%; and
   heating the porous carbon-carbon composites.

2. The method according to claim 1, wherein the stacking step includes arranging the porous carbon-carbon composites in groups of between approximately 50 and 200 porous carbon-carbon composites.

3. The method according to claim 1, wherein the plate is a spacer plate, and the arranging step is arranging the spacer plate between groups of porous carbon-carbon composites.

4. The method according to claim 3, wherein the determining step includes determining a weight of the spacer plate.

5. The method according to claim 3, wherein the determining step includes determining a planform of the spacer plate, the planform being approximately equal to the planform of the porous carbon-carbon composite.

6. The method according to claim 5, wherein the planform of the spacer plate is less than approximately two inches greater than the planform of the porous carbon-carbon composites.

7. The method according to claim 3, wherein the determining step includes determining a thickness of the spacer plate, the thickness is less than approximately one half inch.

8. The method according to claim 7, wherein the thickness is between one eighth to three eighths of an inch.

9. The method according to claim 1, comprising multiple spacer plates and groups arranged in alternating relationship to provide multiple porous carbon-carbon composite assemblies, a first porous carbon-carbon composite assembly arranged on a first lifting plate, a second lifting plate arranged on the first porous carbon-carbon composite assembly and a second porous carbon-carbon composite assembly arranged on the second lifting plate, wherein the determining step includes determining the presence and size for the second lifting plate.

10. The method according to claim 1, wherein the pressure differential is less than approximately +/−25%.

11. The method according to claim 1, wherein the pressure differential is less than approximately +/−15%.

12. The method according to claim 1, wherein the heated porous carbon-carbon composites have a density in the range of 0.51-0.55 g/mL.

* * * * *